US010858486B2

(12) United States Patent
Lee et al.

(10) Patent No.: US 10,858,486 B2
(45) Date of Patent: Dec. 8, 2020

(54) SUPER ABSORBENT POLYMER AND METHOD FOR PRODUCING SAME

(71) Applicant: LG Chem, Ltd., Seoul (KR)

(72) Inventors: Seung Mo Lee, Daejeon (KR); Gi Cheul Kim, Daejeon (KR); Ki Hyun Kim, Daejeon (KR); Je Kyun Lee, Daejeon (KR); Jong Hun Kim, Daejeon (KR); Taegyeong Kang, Daejeon (KR)

(73) Assignee: LG Chem, Ltd.

( * ) Notice: Subject to any disclaimer, the term of this patent is extended or adjusted under 35 U.S.C. 154(b) by 524 days.

(21) Appl. No.: 15/757,055

(22) PCT Filed: Mar. 17, 2016

(86) PCT No.: PCT/KR2016/002726
§ 371 (c)(1),
(2) Date: Mar. 2, 2018

(87) PCT Pub. No.: WO2017/155148
PCT Pub. Date: Sep. 14, 2017

(65) Prior Publication Data
US 2018/0244868 A1  Aug. 30, 2018

(30) Foreign Application Priority Data
Mar. 11, 2016  (KR) .................. 10-2016-0029838

(51) Int. Cl.
| C08J 3/24 | (2006.01) |
| C08F 20/06 | (2006.01) |
| C08J 3/075 | (2006.01) |
| C08J 3/12 | (2006.01) |
| C08K 7/26 | (2006.01) |
| C08L 33/02 | (2006.01) |
| C08K 3/34 | (2006.01) |
| C08K 3/36 | (2006.01) |

(52) U.S. Cl.
CPC ............ *C08J 3/24* (2013.01); *C08F 20/06* (2013.01); *C08J 3/075* (2013.01); *C08J 3/12* (2013.01); *C08J 3/245* (2013.01); *C08K 3/34* (2013.01); *C08K 3/36* (2013.01); *C08K 7/26* (2013.01); *C08L 33/02* (2013.01); *C08J 2333/02* (2013.01); *C08J 2333/08* (2013.01); *C08J 2333/10* (2013.01)

(58) Field of Classification Search
CPC ....... C08J 3/24; C08J 3/075; C08J 3/12; C08J 3/245; C08J 2333/02; C08J 2333/08; C08J 2333/10; C08F 20/06; C08K 3/34; C08K 3/36; C08K 7/26; C08L 33/02
USPC ..................................................... 502/402
See application file for complete search history.

(56) References Cited

U.S. PATENT DOCUMENTS

| 4,883,478 A | 11/1989 | Lerailler et al. |
| 5,985,944 A | 11/1999 | Ishizaki et al. |
| 6,323,387 B1 | 11/2001 | Soga et al. |
| 6,573,330 B1 | 6/2003 | Fujikake et al. |
| 9,701,767 B2 | 7/2017 | Kim et al. |
| 2001/0038831 A1 | 11/2001 | Park et al. |
| 2005/0075617 A1 | 4/2005 | Vartiainen |
| 2008/0287561 A1 | 11/2008 | Menashi et al. |
| 2010/0198177 A1 | 8/2010 | Yahiaoui et al. |
| 2012/0258851 A1 | 10/2012 | Nakatsuu et al. |
| 2014/0305000 A1 | 10/2014 | Ren et al. |
| 2015/0259522 A1 | 9/2015 | Lee et al. |
| 2015/0283284 A1 | 10/2015 | Azad et al. |

FOREIGN PATENT DOCUMENTS

| CA | 2192805 C | 3/2000 |
| CN | 1264321 A | 8/2000 |
| CN | 101346420 A | 1/2009 |
| EP | 3098245 A1 | 11/2016 |
| JP | 2001335645 A | 12/2001 |
| JP | 4583516 B2 | 11/2010 |
| JP | 2011178969 A | 9/2011 |
| JP | 5179044 B2 | 4/2013 |
| JP | 2013094296 A | 5/2013 |
| KR | 100259729 B1 | 7/2000 |
| KR | 100485227 B1 | 8/2005 |
| KR | 100591961 B1 | 6/2006 |
| KR | 20110118651 A | 10/2011 |
| KR | 20120132475 A | 12/2012 |
| KR | 20150070136 A | 6/2015 |
| KR | 101559081 B1 | 10/2015 |
| WO | 1987003208 A1 | 6/1987 |
| WO | 1998051408 A1 | 11/1998 |
| WO | 2011119745 A2 | 9/2011 |
| WO | 2015199363 A1 | 12/2015 |

OTHER PUBLICATIONS

Chinese Search Report for Application No. 201680054090.X, dated Mar. 16, 2020, pp. 1-2.
Extended European Search Report including Written Opinion for Application No. EP16893663.1 dated Oct. 1, 2018.
Schwalm, Reinhold, "UV Coatings: Basics, Recent Developments and New Applications", Elsevier Science (Dec. 21, 2006), p. 115.
Odian, George, "Principles of Polymerization", John Wiley and Sons, Inc. 1981, p. 203.
International Search Report for PCT/KR20161002726 dated Dec. 9, 2016.

*Primary Examiner* — Edward M Johnson
(74) *Attorney, Agent, or Firm* — Lerner, David, Littenberg, Krumholz & Mentlik, LLP

(57) ABSTRACT

The present invention relates to a super absorbent polymer and a production method thereof which enable production of a super absorbent polymer exhibiting a more improved absorption rate while maintaining excellent absorption characteristics.

14 Claims, No Drawings

SUPER ABSORBENT POLYMER AND METHOD FOR PRODUCING SAME

CROSS-REFERENCE TO RELATED APPLICATION(S)

The present application is a national phase entry under 35 U.S.C. § 371 of International Application No. PCT/KR2016/002726, filed on Mar. 17, 2016, which claims priority to and the benefit of Korean Patent Application No. 10-2016-0029838, filed on Mar. 11, 2016, with the Korean Intellectual Property Office, the disclosures of which is incorporated herein by reference.

TECHNICAL FIELD

The present invention relates to a super absorbent polymer and a production method thereof which enable production of a super absorbent polymer exhibiting a more improved absorption rate while maintaining excellent absorption characteristics.

BACKGROUND

Super absorbent polymer (SAP) is a synthetic polymer material capable of absorbing moisture from about 500 to about 1,000 times its own weight, and each manufacturer has denominated it as different names such as SAM (Super Absorbency Material), AGM (Absorbent Gel Material) or the like. Such super absorbent polymers started to be practically applied in sanitary products, and now they are widely used for preparation of various products, for example, hygiene products such as paper diapers for children or sanitary napkins, water retaining soil products for gardening, water stop materials for the civil engineering and construction, sheets for raising seedling, fresh-keeping agents for food distribution fields, materials for poultice or the like.

In most cases, these super absorbent polymers have been widely used in the field of hygienic materials such as diapers or sanitary napkins. For these applications, the super absorbent polymer should exhibit a high moisture absorbency, and it is necessary to exhibit excellent absorption characteristics, for example, it should not release the absorbed water even in the external pressure. Further, in recent years, an absorption rate for more quickly absorbing and storing a target solution such as moisture is more required. Basically, absorption of the super absorbent polymer in an aqueous solution occurs on the polymer surface. Therefore, in order to improve the absorption rate, a method of widening the surface area of the super absorbent polymer can be considered. In this connection, a method for increasing the absorption rate, such as a method of reducing the particle diameter of the super absorbent polymer or forming a porous structure, has been considered since long before.

However, it is known that the super absorbent polymer tends to decrease its basic absorption characteristics as the particle diameter decreases. In addition, additives used for forming a conventional porous structure such as a surfactant have disadvantages of lowering the surface tension of the super absorbent polymer and weakening the internal cross-linking structure, thereby lowering the physical properties of the water absorbent polymer, which can also adversely affect the physical properties of sanitary materials. For these reasons, there was a limit to improve the absorption rate by a method conventionally known in the art, and it has been difficult to improve the absorption rate and also maintain other physical properties such as excellent absorption characteristics.

Technical Problem

It is an object of the present invention to provide a method for preparing a super absorbent polymer which enables production of a super absorbent polymer exhibiting a more improved absorption rate while maintaining excellent absorption characteristics.

It is another object of the present invention to provide a super absorbent polymer exhibiting a more improved absorption rate while maintaining excellent absorption characteristics

Technical Solution

In this regard, the invention provides a method for producing a super absorbent polymer, the method comprising the steps of:

carrying out a cross-linking polymerization of a monomer composition including a monomer containing a water-soluble ethylenically unsaturated compound or a salt thereof, a foaming agent and a porous aerogel in the presence of an internal crosslinking agent; and drying, pulverizing and classifying the cross-linked hydrogel polymer, wherein the porous aerogel is a composite aerogel of one or more metal oxides selected from the group consisting of alkali metals and alkaline earth metals, and silica, which includes a plurality of nanopores.

The present invention also provides a super absorbent polymer comprising:

a base resin powder including a cross-linked polymer of a monomer containing a water-soluble ethylenically unsaturated monomer or a salt thereof; and a surface cross-linked layer that is formed on the base resin powder and is further cross-linked from the cross-linked polymer, wherein the super absorbent polymer comprises a porous aerogel including a plurality of nanopores within the cross-linked structure of the cross-linked polymer and including a composite aerogel of one or more metal oxides selected from the group consisting of alkali metals and alkaline earth metals, and silica.

DETAILED DESCRIPTION OF THE EMBODIMENTS

Hereinafter, a super absorbent polymer and a method for producing the same according to specific embodiments of the invention will be described in more detail. However, these are given for illustrative purposes only, and the scope of the invention is not intended to be limited thereto. It will be apparent to those skilled in the art that various modifications may be made to the embodiments without departing from the scope of the invention.

In addition, unless specifically stated, the term "comprise", "contain", "include" and the like as used herein refers to including any elements (or components) without particular limitation and cannot be interpreted as excluding addition of other elements (or components).

According to one embodiment of the present invention, there is provided a method for producing a super absorbent polymer, the method comprising the steps of:

carrying out a cross-linking polymerization of a monomer composition including a monomer containing a water-soluble ethylenically unsaturated compound or a salt thereof, a foaming agent and a porous aerogel in the presence of an internal crosslinking agent; and drying, pulverizing and classifying the cross-linked hydrogel polymer, wherein the porous aerogel is a composite aerogel of one or more metal oxides selected from the group consisting of alkali metals and alkaline earth metals, and silica aerogel, which includes a plurality of nanopores.

In the method for producing a super absorbent polymer, the porous aerogel may be a metal oxide-silica composite aerogel having a BET specific surface area of 100 to 700 $m^2/g$, or 150 to 600 $m^2/g$ and including a plurality of nanopores having an average diameter of 1 to 25 nm.

Through continuous experiments, the present inventors have found that a super absorbent polymer is provided by using a specific metal oxide-silica composite aerogel that satisfies certain porosity and specific surface area, etc., and a foaming agent together, it is possible to produce a super absorbent polymer resin exhibiting a more improved absorption characteristics and also improved absorption rate, thereby completing the invention.

When the porous metal oxide-silica composite aerogel is used for the polymerization process, the size of the bubbles generated by the foaming agent can be controlled instead of the additives such as surfactants that have been used in the past, and these bubbles can be stabilized during the polymerization process. The stabilized pores are stably retained in the pores in the finally prepared super absorbent polymer, and as a result, super absorbent polymers having optimized specific surface area and porosity can be produced. Thus, according to the production method of one embodiment, a super absorbent polymer with improved absorption rate can be produced.

Further, the porous metal oxide-silica composite aerogel can exhibit hydrophilicity similar to that of the super absorbent polymer and the base resin powder contained therein. As a result, it is possible to reduce the decrease in physical properties, absorption characteristics or absorption rate resulting from the addition, as compared with surfactants or the like which are conventional additives.

Furthermore, the porous metal oxide-silica composite aerogel may bind or interact with a carboxyl group contained in a basic polymer forming a super absorbent polymer or the like, that is, a cross-linking polymer of a monomer such as acrylic acid or a salt thereof. Thus, the above porous metal oxide-silica composite aerogel can be present in the super absorbent polymer in a cross-linked form similarly to the cross-linked polymer. Therefore, the porous metal oxide-silica composite aerogel can minimize weakening of the cross-linked structure due to the addition, thereby reducing the content of water-soluble matter and improving absorption characteristics such as absorbency under pressure, despite the increase in absorption rate.

As a result, the super absorbent polymer formed by the method of one embodiment can exhibit excellent absorption characteristics as well as more improved absorption rate.

Hereinafter, a method for producing a super absorbent polymer according to one embodiment will be specifically described for each step.

First, in the method for producing a super absorbent polymer according to one embodiment, a water-soluble ethylenically unsaturated compound or a salt thereof, which is known to be usable as the monomer for the production of a super absorbent polymer, can be used without any limitation.

More specific examples of such monomer include at least one selected from the group consisting of anionic monomers of acrylic acid, methacrylic acid, maleic anhydride, fumaric acid, crotonic acid, itaconic acid, 2-acryloylethanesulfonic acid, 2-methacryloylethanesulfonic acid, 2-(meth)acryloyl-propanesulfonic acid, or 2-(meth)acrylamido-2-methylpropanesulfonic acid, and their salts; non-ionic, hydrophilic group-containing monomers of (meth)acrylamide, N-substituted (meth)acrylate, 2-hydroxyethyl(meth)acrylate, 2-hydroxypropyl(meth)acrylate, methoxypolyethylene glycol (meth)acrylate or polyethylene glycol (meth)acrylate; and amino group-containing unsaturated monomers of (N,N)-dimethylaminoethyl (meth)acrylate or (N,N)-dimethylaminopropyl (meth)acrylamide, and their quaternary product.

In particular, the monomer may include a monomer (a salt of an anionic monomer) in which an acidic group contained in the anionic monomer is at least partially neutralized. More specifically, acrylic acid or a salt thereof may be used as the monomer, and when acrylic acid is used, at least a part thereof may be neutralized and used. By using these monomers, it becomes possible to produce a super absorbent polymer having more excellent physical properties. For example, as the water-soluble ethylenically unsaturated monomer, acrylic acid may be used and an alkali metal salt thereof may be used together. In this case, acrylic acid may be used by partially neutralizing it with a basic compound such as sodium hydroxide (NaOH).

In the monomer composition containing the monomer and the like, the concentration of the water-soluble ethylenically unsaturated monomer or a salt thereof may be 20% to 60% by weight, or 40% to 50% by weight, based on the total amount of the monomer composition, which can be an appropriate concentration in consideration of polymerization time, reaction conditions and the like. However, if the concentration of the monomer is excessively low, the yield of the super absorbent polymer can be lowered and thus economical problems may arise. On the other hand, if the concentration is excessively high, it may arise problems in the processes, for example, a part of the monomer may be precipitated, or the pulverization efficiency may be lowered during pulverization of the polymerized hydrogel polymer, etc., and the physical properties of the super absorbent polymer may be deteriorated.

In the production method of this embodiment, in order to control the porosity of the super absorbent polymer and further improve its absorption rate, a foaming agent and a specific porous aerogel satisfying predetermined physical properties may be used together with the monomer.

First, as the foaming agent, any foaming agent (bubble-forming agent), which is known to be used in the polymerization of (meth)acrylic acid to enable the formation of a porous polymer, can be used. In these foaming agents, bubbles are generated in the monomer composition so that the cross-linked polymer exhibits porosity.

Specific examples of such foaming agent include a carbonate salt of an alkali metal or an alkaline earth metal. More specific examples thereof include one or more selected from the group consisting of sodium bicarbonate, sodium carbonate, potassium bicarbonate, potassium carbonate, calcium bicarbonate, calcium carbonate, magnesium bicarbonate and magnesium carbonate. In addition, various other foaming agents can be used.

The porous aerogel that can be used includes a composite aerogel of one or more metal oxides selected from the group consisting of alkali metals and alkaline earth metals, and silica, which includes a plurality of nanopores.

Such porous metal oxide-silica composite aerogel can be produced, basically, by using a metal ion solution containing ions of the metal oxide and a water glass solution containing silicate-based water glass as reactants, reacting them in the presence or absence of an acid or base catalyst or the like, to obtain a metal oxide-silica composite wet gel, and then drying the resultant.

The specific conditions and the like of these production methods are controlled to produce a porous metal oxide-silica composite aerogel exhibiting porosity, specific surface area and the like described later, and specific production methods and conditions of these porous metal oxide-silica composite aerogel are described in Production Examples described later. In addition, it goes without saying that a porous metal oxide-silica composite aerogel having the above-mentioned porosity and specific surface area, and the like may be commercially obtained and used.

In addition, such as composite aerogel is known to exhibit hydrophilicity in itself when it is not subjected to another surface treatment or the like, and thus it can appropriately used in such untreated state.

Meanwhile, as already mentioned above, since the porous metal oxide-silica composite aerogel is used during polymerization to produce a super absorbent polymer, it is possible to obtain a super absorbent polymer in which the porosity is optimized and the absorption rate is improved, as compared with the case of using only a foaming agent or using other additives such as surfactants together with the foaming agent. Further, as such composite aerogel exhibits hydrophilicity and forms a cross-linked structure or the like in the super absorbent polymer, the super absorbent polymer produced by the method of one embodiment does not substantially exhibit deterioration of physical properties due to addition of the composite aerogel, but can rather exhibit excellent physical properties such as improved absorption characteristics, absorption rate and absorbency under pressure, and reduced content of water-soluble matter.

As the porous metal oxide-silica composite aerogels, those having a BET specific surface area of 100 to 700 $m^2/g$, or 150 to 600 $m^2/g$, or 150 to 450 $m^2/g$ and including a plurality of nanopores having an average diameter of 1 to nm or 2 to 20 nm can be used. Thus, as the composite aerogels exhibit appropriate specific surface area and porosity and the like, the cross-linked polymer in the super absorbent polymer can exhibit proper porosity, and the super absorbent polymer finally produced by the method of one embodiment can exhibit a more enhanced absorption rate.

Further, the composite aerogel can contain an alkali metal such as sodium or potassium or an alkaline earth metal such as magnesium or calcium as a metal oxide, and calcium and magnesium can be suitably contained as the alkaline earth metal in view of more excellent physical properties or the like of the super absorbent polymer.

Moreover, the porous aerogel of the composite aerogel can contain 1 to 10% by weight of the metal oxide relative to the total content. In a more specific example, when the composite aerogel contains magnesium and calcium, the content in total thereof may be included in an amount of 1% by weight or more, or 1 to 10% by weight.

A super absorbent polymer exhibiting a more improved absorption rate can be produced by using the porous aerogel including the composite aerogel described above together with the foaming agent. This seems to be because the size of the bubbles generated by the decomposition of the foaming agent is appropriately controlled and stabilized by the composite aerogel and thus a super absorbent polymer having optimized porosity can be produced. Further, due to the interaction/bonding between the composite aerogel and the carboxyl group of the super absorbent polymer, deterioration of physical properties of the super absorbent polymer due to additives such as composite aerogel can be minimized, and in particular, the content of water-soluble matter decreases and thus the super absorbent polymer produced by the method of one embodiment can exhibit more excellent physical properties.

Further, the porous aerogel of the above-mentioned composite aerogel and the foaming agent may be separately put into a monomer composition in an aqueous solution state, or may be put in a state where two components are mixed. Further, in order to control the appropriate porosity of the super absorbent polymer by using such a porous aerogel and a foaming agent, the foaming agent and the aerogel each can be used in an amount of 0.05 to 5 parts by weight based on 100 parts by weight of the unsaturated compound (for example, unneutralized acrylic acid) contained in the above monomer. Thereby, the porosity and absorption rate of the finally prepared super absorbent polymer can be optimized. If the porous aerogel is used in an excessively small amount, the porosity and absorption rate of the super absorbent polymer may not be sufficient. Also, if the porous aerogel is used in an excessively large content, it is not properly dispersed or dissolved in the monomer composition and is unevenly distributed, which may lower the absorption rate or absorption characteristics of the super absorbent polymer.

In addition, the monomer composition may further include a polymerization initiator that is generally used in the preparation of a super absorbent polymer.

Specifically, as the polymerization initiator, a thermal polymerization initiator, a photo-polymerization initiator by UV irradiation can be used depending on the polymerization method such as a thermal polymerization and a photo-polymerization. However, even in the case of the photo-polymerization method, a certain amount of heat is generated by ultraviolet irradiation or the like, and a certain amount of heat is generated in accordance with the progress of the polymerization reaction, which is an exothermic reaction, and thus, a thermal polymerization initiator may further be included.

The photo-polymerization initiator that can be used is not particularly limited by its constitution as long as it is a compound capable of forming a radical by light such as ultraviolet rays.

The photo-polymerization initiator used herein may include, for example, at least one selected from the group consisting of benzoin ether, dialkyl acetophenone, hydroxyl alkylketone, phenyl glyoxylate, benzyl dimethyl ketal, acyl phosphine and α-aminoketone. On the other hand, as the specific example of the acyl phosphine, commercially available Lucirin TPO, namely, 2,4,6-trimethyl-benzoyl-trimethyl phosphine oxide, may be used. More various photo-polymerization initiators are well disclosed in "UV Coatings: Basics, Recent Developments and New Application" written by Reinhold Schwalm, (Elsevier, 2007), p 115, the content of which is incorporated herein by reference.

The photo-polymerization initiator may be added in a concentration of about 0.01 to 1.0% by weight with respect to the monomer composition. When the concentration of the photo-polymerization initiator is too low, the polymerization rate may become slow, and when the concentration of the photo-polymerization initiator is too high, the molecular weight of the super absorbent polymer may be small and the physical properties may become uneven.

Further, as the thermal polymerization initiator, at least one selected from the group consisting of persulfate-based initiator, azo-based initiator, hydrogen peroxide and ascorbic acid can be used. Specifically, examples of the persulfate-based initiators include sodium persulfate ($Na_2S_2O_8$), potassium persulfate ($K_2S_2O_8$), ammonium persulfate (($NH_4$)$_2S_2O_8$) and the like, and examples of the azo-based initiator include 2,2-azobis(2-amidinopropane)dihydrochloride, 2,2-azobis-(N,N-dimethylene)isobutyramidine dihydrochloride, 2-(carbamoylazo)isobutylonitril, 2,2-azobis[2-(2-imidazolin-2-yl)propane]dihydrochloride, 4,4-azobis-(4-cyanovaleric acid) and the like. More various thermal polymerization initiators are well disclosed in "Principle of Polymerization" written by Odian, (Wiley, 1981), p 203, the content of which is incorporated herein by reference.

The thermal polymerization initiator may be included at a concentration of 0.001 to 1.0% by weight with respect to the monomer mixture. If the concentration of such a thermal polymerization initiator is too low, additional thermal polymerization hardly occurs and the effect due to the addition of the thermal polymerization initiator may be insignificant. If the concentration of the thermal polymerization initiator is excessively high, the molecular weight of the super absorbent polymer may be small and the physical properties may become uneven.

Meanwhile, in the method of one embodiment, after the monomer composition containing the above-described respective components is formed in the form of an aqueous solution or suspension, crosslinking polymerization of the monomer composition may proceed in the presence of an internal crosslinking agent to form a hydrogel polymer.

In this case, as the internal crosslinking agent, any crosslinking agent that is known to be usable for the production of a super absorbent polymer since long before may be used. As a specific example thereof, the internal crosslinking agent may be at least one selected from the group consisting of N,N'-methylenebisacrylamide, trimethylolpropane tri (meth)acrylate, ethylene glycol di(meth)acrylate, polyethylene glycol di(meth)acrylate, propylene glycol di(meth)acrylate, polypropylene glycol di(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, and pentaerythritol tetraacrylate. In addition, various other internal crosslinking agents can be used.

The internal crosslinking agent may be added at a concentration of 0.001 to about 5% by weight, about 0.001 to about 3% by weight, about 0.001 to about 1% by weight or about 0.001 to about 0.5% by weight, based on the monomer composition. Particularly, as the internal crosslinking agent is used in an amount of 0.01 to 5 parts by weight, 0.01 to 3 parts by weight, 0.01 to 1 parts by weight, or 0.1 to 0.6 part by weight, relative to 100 parts by weight of the unneutralized water-soluble ethylenically unsaturated compound described above, for example, the unneutralized acrylic acid, the super absorbent polymer having an optimized crosslinked structure and having more excellent physical properties can be produced.

Meanwhile, the monomer composition may further include additives such as a thickener, a plasticizer, a preservation stabilizer, an antioxidant and the like, if necessary.

Moreover, the above-mentioned monomers, foaming agents, porous aerogels and the like may be prepared in the form of a solution or a suspension in which they are dissolved or dispersed in a solvent.

Any usable solvent can be used without being limited by its constitution as long as it can dissolve the above-mentioned components. Examples of the solvent may include at least one selected from the group consisting of water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, N,N-dimethylacetamide, and the like. They may be used alone or in combination.

The solvent may be contained in the residual amount excluding the above-mentioned components with respect to the total content of the monomer mixture.

Meanwhile, the method for carrying out a thermal polymerization and a photo-polymerization of the monomer composition to form a hydrogel polymer is not particularly limited by its constitution as long as it is a polymerization method commonly used in the art.

Specifically, the polymerization method can be largely classified into a thermal polymerization and a photo-polymerization according to a polymerization energy source. Typically, in the case of the thermal polymerization, it may be carried out in a reactor like a kneader equipped with stirring spindles, and the thermal polymerization may be carried out at a temperature of 40 to 120° C.

On the other hand, in the case of the photo-polymerization, the polymerization may be carried out in a reactor equipped with a movable conveyor belt, but the above-mentioned polymerization method is only an example, and the present invention is not limited to the polymerization method described above.

The hydrogel polymer obtained by the above-mentioned method may have a water content of about 40 to 80% by weight. Meanwhile, the "water content" as used herein means a weight occupied by moisture with respect to a total amount of the hydrogel polymer, which may be the value obtained by subtracting the weight of the dried polymer from the weight of the hydrogel polymer. Specifically, the water content can be defined as a value calculated by measuring the weight loss due to evaporation of moisture in the polymer in the drying process by raising the temperature of the polymer through infrared heating. At this time, the water content is measured under the drying conditions determined as follows: the drying temperature is increased from room temperature to about 180° C. and then the temperature is maintained at 180° C., and the total drying time is set to 40 minutes, including 5 minutes for the temperature rising step.

After the monomers are polymerized into cross-linked polymer, the base polymer powder can be obtained through steps such as drying, pulverization, classification, and the like, and through the steps such as pulverization and classification, the base polymer powder and the super absorbent polymer obtained therefrom are suitably produced and provided so as to have a particle diameter of 150 to 850 μm. More specifically, at least 95% by weight or more of the base polymer powder and the super absorbent polymer obtained therefrom has a particle diameter of 150 μm to 850 μm and a fine powder having a particle diameter of less than 150 μm can contained in an amount of less than 3% by weight.

As the particle diameter distribution of the base polymer powder and the super absorbent polymer is adjusted to the preferable range as described above, the super absorbent polymer finally produced can exhibit excellent absorption rate and absorption characteristics.

Meanwhile, the method of drying, pulverization and classification will be described in more detail below.

First, in the drying of the hydrogel polymer, a step of coarse pulverization (gel pulverization) may be further carried out before drying in order to improve the efficiency of the drying step, if necessary.

In this case, a pulverizing machine used may include, but its configuration is not limited to, for example, any one selected from the group consisting of a vertical pulverizing device, a turbo cutter, a turbo grinder, a rotary cutter mill, a cutter mill, a disc mill, a shred crusher, a crusher, a chopper, and a disc cutter. However, it is not limited to the above-described examples.

In this case, the coarsely pulverizing step may be carried out so that the particle diameter of the hydrogel polymer becomes 0.1 to 20 mm.

Pulverizing the hydrogel polymer into a particle diameter of less than 0.1 mm is technically not easy due to its high water content, and mutual agglomeration may occur between the pulverized particles. Meanwhile, if the polymer is pulverized into a particle diameter of greater than 10 mm, the effect of increasing the efficiency in the subsequent drying step may be insignificant.

The hydrogel polymer coarsely pulverized as described above or the hydrogel polymer immediately after polymerization without the coarsely pulverizing step is subjected to a drying step. In this case, the drying temperature of the drying step may be 150 to 250° C. When the drying temperature is less than 150° C., it is likely that the drying time becomes too long and the physical properties of the super absorbent polymer finally formed are deteriorated, and when the drying temperature is higher than 250° C., only the surface of the polymer is excessively dried, and thus it is likely that fine powder may be generated during the subsequent pulverizing step and the physical properties of the super absorbent polymer finally formed is deteriorated. Therefore, preferably, the drying can be carried out at a temperature of 150 to 200° C., more preferably 160 to 190° C.

Meanwhile, the drying time may be 20 to 90 minutes, in consideration of the process efficiency and the like, but it is not limited thereto.

The drying method of the drying step may also be selected and used without being limited by its constitution as long as it is a method generally used for drying the hydrogel polymer. Specifically, the drying step may be carried out by a method such as hot air supply, infrared irradiation, microwave irradiation or ultraviolet irradiation. The water content of the polymer after such a drying step may be 0.1% to 10% by weight.

Next, a step of pulverizing the dried polymer obtained through such a drying step is carried out.

The polymer powder obtained after the pulverizing step may have a particle diameter of 150 μm to 850 μm. Specific examples of a pulverizing device that can be used for pulverizing the polymer to have the above particle diameter may include a pin mill, a hammer mill, a screw mill, a roll mill, a disc mill, a jog mill or the like, but it is not limited thereto.

Also, in order to control the physical properties of the super absorbent polymer powder finally commercialized after the pulverization step, a separate step of classifying the polymer powder obtained after the pulverization depending on the particle diameter may be undergone. Preferably, a polymer having a particle diameter of 150 to 850 μm is classified and only the polymer powder having such a particle diameter can be subjected to the surface cross-linking reaction and finally commercialized. Since the particle diameter distribution of the base polymer powder obtained through such a process has already been described above, a further detailed description thereof will be omitted.

Meanwhile, after the step of forming the base polymer powder described above, the surface cross-linked layer can be formed by further cross-linking the surface of the base polymer powder in the presence of the surface cross-linking agent, and thereby the super absorbent resin can be produced.

In the surface cross-linking step, any surface cross-linking agent known in the technical field to which the present invention belongs can be used without particular limitation. Examples of such surface crosslinking agent include at least one selected from the group consisting of polyhydric alcohol compounds, epoxy compounds, polyamine compounds, haloepoxy compounds and their condensed products, oxazoline compounds, mono-, di- and poly-oxazolidinone compounds, cyclic urea compounds, polyvalent metal salt and an alkylene carbonate compound. In addition, various other surface cross-linking agents can be used.

Further, in the surface cross-linking step, as the surface cross-linking proceeds by adding a polyvalent metal cation together with the surface cross-linking agent, the surface cross-linking structure of the super absorbent polymer can be further optimized. This is predicted because these metal cations can further reduce the cross-linking distance by forming a chelate with the carboxyl group (COOH) of the super absorbent polymer.

Further, the method of adding the surface cross-linking agent to the base polymer powder is not limited by its construction. For example, a method of adding a surface cross-linking agent and a base polymer powder to a reaction tank and mixing them, or a method of spraying a surface cross-linking agent or the like onto the base polymer powder, a method continuously providing a base polymer powder and a surface cross-linking agent to a continuously operated mixer and mixing them, or the like, can be used.

When the surface cross-linking agent is added, both water and methanol can be additionally mixed and added. When water and methanol are added, there is an advantage that the surface cross-linking agent can be uniformly dispersed in the base polymer powder. At this time, the content of water and methanol to be added can be applied by adjusting the addition ratio to 100 parts by weight of the base resin powder, for the purpose of inducing uniform dispersion of the surface cross-linking agent, preventing the aggregation phenomenon of the base polymer powder, and optimizing the penetration depth of the surface of the cross-linking agent.

In order to produce a super absorbent polymer exhibiting more excellent physical properties, the surface cross-linking step can be carried out at a temperature of about 110° C. to 200° C.

More specifically, the conditions of the surface cross-linking step may be the conditions where the maximum reaction temperature is 140° C. or higher, or 160 to 200° C., and the retention time at the maximum reaction temperature is 20 minutes or more, or 20 minutes or more and 1 hour or less. In addition, the temperature raising time required to reach from a temperature at the start of the first reaction, for example, a temperature of about 30° C. or more, or 30 to 120° C. to the maximum reaction temperature can be controlled to 10 minutes or more, or 10 minutes or more and 1 hour or less. The surface crosslinking structure is optimized by satisfying the above-mentioned surface cross-linking process conditions, so that a super absorbent polymer exhibiting more excellent absorption characteristics and the like can be produced.

The temperature raising means for the surface crosslinking reaction is not particularly limited. The heating can be carried out by providing a heating medium or directly providing a heating source. The type of heat medium that can be used here includes a heated fluid such as steam, hot air, hot oil, etc., but it is not limited thereto. Further, the temperature of the heating medium to be provided can be appropriately selected in consideration of the means of the heating medium, the temperature raising speed, and the temperature raising target temperature. Meanwhile, a heat source to be provided directly may include a heating method using electricity or a heating method using gas, but is not limited thereto.

The super absorbent polymer obtained according to the production method of one embodiment described above can exhibit very excellent characteristics in which various physical properties such as a centrifuge retention capacity and an absorbency under pressure are improved together, and exhibit excellent physical properties that can be suitably used for sanitary articles such as diapers.

The super absorbent polymer produced by the method of the above-mentioned embodiment comprises, for example, a base resin powder including a cross-linked polymer of a monomer containing a water-soluble ethylenically unsaturated monomer or a salt thereof; and a surface cross-linked layer that is formed on the base resin powder and is further cross-linked from the cross-linked polymer, wherein the super absorbent polymer comprises a porous aerogel that includes a plurality of nanopores within the cross-linked structure of the cross-linked polymer and includes a composite aerogel of one or more metal oxides selected from the group consisting of alkali metals and alkaline earth metals, and silica.

Such super absorbent polymer exhibit excellent absorption characteristics in which a centrifuge retention capacity (CRC) for a physiological saline solution (0.9 wt % sodium chloride aqueous solution) for 30 minutes is 30 to 45 g/g, or 35 to 40 g/g, or 36 to 39 g/g and also have improved absorption characteristics in which a vortex absorption rate of the super absorbent polymer having a particle diameter of 300 to 600 μm (for example, a super absorbent polymer classified to have a particle diameter of 300 to 600 μm) is 35 to 70 sec, or 40 to 60 sec.

The centrifuge retention capacity (CRC) for a physiological saline solution can be measured according to EDANA recommended test method No. WSP 241.2. More specifically, the centrifuge retention capacity can be calculated according to the following Calculation Equation 1 after absorbing the super absorbent polymer in a physiological saline solution for 30 minutes:

$$CRC(g/g) = \{[W_2(g) - W_1(g)]/W_0(g)\} - 1 \quad \text{[Calculation Equation 1]}$$

in the above calculation equation 1, $W_0(g)$ is an initial weight(g) of the super absorbent polymer, $W_1(g)$ is a weight of the device not including the super absorbent polymer, which is measured after performing dehydration by using a centrifuge at 250G for 3 minutes, and $W_2(g)$ is a weight of the device including the super absorbent polymer, which is measured after immersing and absorbing the super absorbent polymer in a physiological saline solution (0.9 wt % sodium chloride aqueous solution) at room temperature for 30 minutes and then performing dehydration by using a centrifuge at 250G for 3 minutes.

Further, the vortex absorption rate can be measured in seconds according to the method described in International Publication WO 1987/003208. More specifically, the vortex absorption rate is calculated by measuring in seconds the amount of time required for the vortex to disappear after adding 2 grams of a super absorbent polymer to 50 mL of physiological saline solution and then stirring the mixture at 600 rpm. As more specifically described in Examples below, in the present invention the vortex absorption rate can be measured by controlling a particle diameter of a super absorbent polymer to 300 to 600 μm.

Further, the super absorbent polymer can have a reduced content of water-soluble matter according to the action of the porous aerogels as described above, and thus can exhibit excellent physical properties. For example, the super absorbent polymer may have a content of water-soluble matter of 20% by weight or less, or 5 to 18% by weight.

Advantageous Effects

According to the present invention, a super absorbent polymer having excellent basic absorption properties such as a centrifuge retention capacity as well as improved absorption rate, and a production method thereof can be provided.

EXAMPLES

Hereinafter, preferred Examples are provided for better understanding of the present invention. However, these Examples are provided for illustrative purposes only and the invention are not intended to be limited by these Examples.

In the Preparation Examples, Examples, and Comparative Examples described below, the physical properties of the respective super absorbent polymers and the porous aerosols (porous metal oxide-silica composite aerogel) were measured and evaluated by the following methods.

(1) Evaluation of Particle Diameter

The particle diameters of the base resin powders and the super absorbent polymers used in Examples and Comparative Examples were measured according to according to EDANA (European Disposables and Nonwovens Association) recommended test method No. WSP 220.3.

(2) Centrifuge Retention Capacity (CRC)

The centrifuge retention capacity (CRC) for a physiological saline solution by absorption magnification under no load was measured for the super absorbent polymers of Examples and Comparative Examples in accordance with EDANA (European Disposables and Nonwovens Association) recommended test method No. WSP 241.3.

That is, $W_0(g)$ (about 0.2 g) of the polymers of Examples and Comparative Examples was uniformly put in a nonwoven fabric-made bag, followed by sealing. Then, the bag was immersed in a physiological saline solution composed of 0.9 wt % aqueous sodium chloride solution at room temperature. After 30 minutes, water was removed from the bag by centrifugation at 250 G for 3 minutes, and the weight $W_2(g)$ of the bag was then measured. Further, the same procedure was carried out without using the polymer, and then the resultant weight $W_1(g)$ was measured.

Using the respective weights thus obtained, the centrifuge retention capacity was determined according to the following Calculation Equation 1.

$CRC(g/g) = \{[W_2(g) - W_1(g) - W_0(g)]/W_0(g)\}$ [Calculation Equation 1]

in the above calculation equation 1, $W_0(g)$ is an initial weight(g) of the super absorbent polymer, $W_1(g)$ is a weight of the device not including the super absorbent polymer, which is measured after immersing and absorbing the same in a physiological saline solution at room temperature for 30 minutes and then dehydrating the same by using a centrifuge at 250G for 3 minutes, and $W_2(g)$ is a weight of the device including the polymer, which is measured after immersing and absorbing the super absorbent polymer in a physiological saline solution at room temperature for 30 minutes and then dehydrating the same by using a centrifuge at 250G for 3 minutes.

(3) Vortex Absorption Rate (Vortex Time)

The vortex absorption rate of the super absorbent polymers of Examples and Comparative Examples was measured in seconds according to the method described in International Publication WO 1987/003208.

Specifically, the absorption rate (vortex time) was calculated by measuring in seconds the amount of time required for the vortex to disappear after adding 2 g of the super absorbent polymer having a particle diameter of 300 to 600 μm to 50 mL of physiological saline solution (0.9 wt sodium hydroxide aqueous solution) and then stirring the mixture at 600 rpm.

(4) Content of Water-Soluble Matter

Among the super absorbent polymers of Examples and Comparative Examples, 1.0 g of sample having a particle diameter of 150 to 850 μm was put in a 250 mL Erlenmeyer flask, and 200 mL of a 0.9 wt % sodium chloride aqueous solution was added to a physiological saline solution and subjected to free swelling for 1 hour while stirring at 250 rpm. The aqueous solution was then filtered with a filter paper. The filtered solution was subjected to first titration up to pH 10 with 0.1 N caustic soda solution and then subjected to back titration to pH 2.7 with 0.1 N hydrogen chloride solution. The content (wt %) of water-soluble matter in the super absorbent polymer was measured from the obtained proper amount according to EDANA recommended test method No. WSP 270.3.

(5) Tap Density of Composite Aerogel

The tap density of the composite aerogels of Production Examples 1 to 4 and silica used in Comparative Examples was measured using a tap density measuring device (STAV II, J. Engelsmann AG).

(6) Specific Surface Area and Average Pore Diameter of Composite Aerogel

The specific surface area and the average pore diameter of the composite aerogels of Production Examples 1 to 4 and the silica used in Comparative Examples were analyzed and calculated from the adsorption/desorption amount of nitrogen according to partial pressure (0.11<p/p0<1) using a 3 FLEX apparatus (Micrometric).

(7) Metal Oxide Content of Composite Aerogel

The metal oxide content of the composite aerogels of Production Examples 1 to 4 and the silica used in Comparative Examples was analyzed by using an EDS (Oxford INCA X-RAY Micronalysis System) in FE-SEM apparatus (S-4800, HITACHI). Analysis was carried out five times per sample and taken as an average value.

Production Example 1: Preparation of Metal Oxide-Silica Composite Aerogel (MSC-1)

A metal ion solution containing hydrochloric acid (metal ion concentration 1.0 M; molar ratio of magnesium ion: calcium ion=2:1) was added to a water glass solution (water glass concentration 1.0 M) in an amount such that the molar ratio of the metal ions in a metal ion solution was 0.75 relative to silica in water glass solution. After the addition, the first reaction was carried out to prepare a metal oxide-silica composite agglomerate.

Sodium hydroxide was added to the agglomerate and subjected to a second reaction to prepare a metal oxide-silica composite wet gel. At this time, the acidity (pH) of sodium hydroxide in the first reaction before the addition of the base catalyst was 5.4, and the acidity (pH) in the second reaction after the addition of the base catalyst was 9.5. The wet gel thus prepared was washed with ethanol, then subjected to solid/liquid separation in a water content of 100%, and dried in an oven at 150° C. for 1 hour under normal pressure to prepare a metal oxide-silica composite aerogel.

Production Example 2: Preparation of Metal Oxide-Silica Composite Aerogel (MSC-2)

A composite aerogel was prepared in the same manner as in Production Example 1, except that the acidity (pH) during the first reaction before the addition of the base catalyst was controlled to 4.8, and the acidity (pH) during the second reaction after the addition of the base catalyst was controlled to 8.6.

Production Example 3: Preparation of Metal Oxide-Silica Composite Aerogel (MSC-3)

A composite aerogel was prepared in the same manner as in Production Example 1, except that the acidity (pH) during the first reaction before the addition of the base catalyst was controlled to 6.1, and the acidity (pH) during the second reaction after the addition of the base catalyst was controlled to 9.3.

Production Example 4: Preparation of Metal Oxide-Silica Composite Aerogel (MSC-4)

A metal ion solution containing hydrochloric acid (metal ion concentration 0.5 M; molar ratio of magnesium ion: calcium ion=2:1) was added to a first water glass solution (water glass concentration 0.33M) at a volume ratio of 1:1 relative to a water glass solution.

To the agglomerate, a second water glass solution (water glass concentration: 2.0M) was added and mixed in an amount of 45 vol % relative to the first water glass solution, and then hydrochloric acid was added until the pH reached 5.3, and allowed to react to produce a first metal oxide-silica composite aerogel. A third water glass solution (water glass concentration: 2.0M) was added thereto in an amount of 13.6 vol % relative to the first water glass solution. Hydrochloric acid was added until the pH reached 5.3 and allowed to react to produce a second metal oxide-silica composite wet gel. The produced wet gel was washed with ethanol, then subjected to solid/liquid separation in a water content of 100%, and dried in an oven at 150° C. for 1 hour under normal pressure to produce a metal oxide-silica composite aerogel.

Comparative Production Example 1

SIPERNAT 550LS, a precipitated silica available from Evonic, was used as Comparative Production Example 1.

Physical properties of the aerogels of Production Examples 1 to 4 and silica of Comparative Production Example 1 were measured, and the results are shown in Table 1 below:

TABLE 1

| Physical properties | Production Example 1 (MSC-1) | Production Example 2 (MSC-2) | Production Example 3 (MSC-3) | Production Example 4 (MSC-4) | Comparative Production Example 1 |
|---|---|---|---|---|---|
| Specific surface area ($m^2/g$) | 356 | 272 | 345 | 425 | 457 |
| Average pore diameter (nm) | 8.4 | 13.0 | 10.1 | 23.85 | 15.0 |
| Tap density (g/Ml) | 0.15 | 0.16 | 0.13 | 0.09 | 0.08 |
| Metal oxide content (wt %) | 3.5 | 3.2 | 3.3 | 2.5 | 0.1 |

Example 1: Production of Super Absorbent Polymer 0.1 g of a composite aerogel of Production Example 1 and 1.25 g of sodium bicarbonate ($NaHCO_3$) were mixed to prepare a foam composition. The foam composition was mixed with 100 g of acrylic acid, 0.34 g of polyethylene glycol diacrylate (Mw=598) as a cross-linking agent, 121.5 g of 32% caustic soda (NaOH), 0.008 g of diphenyl(2,4,6-trimethylbenzoyl)-phosphine oxide as UV initiator, 0.200 g of sodium persulfate, and 36.6 g of water were mixed to produce a monomer composition having a monomer concentration of 47% by weight.

Subsequently, the monomer composition was introduced through a feeder of a polymerization reactor equipped with a continuously moving conveyor belt. UV polymerization was performed for 2 minutes by irradiating ultraviolet rays (irradiation amount: 2 mW/$cm^2$) through a UV irradiation device to produce a hydrogel polymer.

The hydrogel polymer was transferred to a cutter and cut into a size of 0.2 cm. At this time, the water content of the cut hydrogel polymer was 50% by weight.

Then, the hydrogel polymer was dried with a hot air dryer at a temperature of 185° C. for 40 minutes, and the dried hydrogel polymer was pulverized with a pin mill. Thereafter, a polymer having a particle size (average particle size size) of less than 150 μm and a polymer having a particle size of 150 μm to 850 μm was classified using a sieve.

Example 2: Production of Super Absorbent Polymer

A super absorbent polymer was produced in the same manner as in Example 1, except that a foam composition including 1 g of the composite aerogel of Production Example 1 and 1 g of sodium bicarbonate was used.

Example 3: Production of Super Absorbent Polymer

A super absorbent polymer was produced in the same manner as in Example 1, except that a foam composition including 0.3 g of the composite aerogel of Production Example 2 and 1 g of sodium bicarbonate was used.

Example 4: Production of Super Absorbent Polymer

A super absorbent polymer was produced in the same manner as in Example 1, except that a foam composition including 0.5 g of the composite aerogel of Production Example 2 and 1 g of sodium bicarbonate was used.

Example 5: Production of Super Absorbent Polymer

A super absorbent polymer was produced in the same manner as in Example 1, except that a foam composition including 0.5 g of the composite aerogel of Production Example 3 and 1 g of sodium bicarbonate was used.

Example 6: Production of Super Absorbent Polymer

A super absorbent polymer was produced in the same manner as in Example 1, except that a foam composition including 1 g of the composite aerogel of Production Example 3 and 1 g of sodium bicarbonate was used.

Example 7: Production of Super Absorbent Polymer

A super absorbent polymer was produced in the same manner as in Example 1, except that a foam composition including 0.3 g of the composite aerogel of Production Example 3 and 0.125 g of sodium bicarbonate was used.

Example 8: Production of Super Absorbent Polymer

A super absorbent polymer was produced in the same manner as in Example 1, except that a foam composition including 0.5 g of the composite aerogel of Production Example 3 and 0.125 g of sodium bicarbonate was used.

Example 9: Production of Super Absorbent Polymer

A super absorbent polymer was produced in the same manner as in Example 1, except that a foam composition including 0.5 g of the composite aerogel of Production Example 4 and 1 g of sodium bicarbonate was used.

Comparative Example 1: Production of Super Absorbent Polymer

A super absorbent polymer was produced in the same manner as in Example 1, except that the composite aerogel of Production Example and sodium bicarbonate were used.

Comparative Example 2: Production of Super Absorbent Polymer

A super absorbent polymer was produced in the same manner as in Example 1, except that the composite aerogel of Production Example was not used and 0.125 g of sodium bicarbonate was used.

Comparative Example 3: Production of Super Absorbent Polymer

A super absorbent polymer was produced in the same manner as in Example 1, except that the composite aerogel of Production Example was not used and 1 g of sodium bicarbonate was used.

Comparative Example 4: Production of Super Absorbent Polymer

A super absorbent polymer was produced in the same manner as in Example 1, except that sodium bicarbonate was not used and 0.1 g of the composite aerogel of Production Example 1 was used.

Comparative Example 5: Production of Super Absorbent Polymer

A super absorbent polymer was produced in the same manner as in Example 1, except that sodium bicarbonate was not used and 1 g of the composite aerogel of Production Example 1 was used.

Comparative Example 6: Production of Super Absorbent Polymer

A super absorbent polymer was produced in the same manner as in Example 1, except that a foam composition including 0.5 g of the precipitated silica of Comparative Production Example 1 and 0.125 g of sodium bicarbonate was used.

The physical property measurement results of the Examples and Comparative Examples are summarized in Table 2 below.

TABLE 2

|  | Vortex(s) | CRC (g/g) | Content of water-soluble matter (wt %) |
|---|---|---|---|
| Example 1 | 55 | 38.0 | 11.9 |
| Example 2 | 57 | 36.7 | 11.8 |
| Example 3 | 49 | 35.8 | 11.5 |
| Example 4 | 45 | 32.5 | 11.0 |
| Example 5 | 47 | 32.6 | 11.0 |
| Example 6 | 49 | 31.8 | 10.6 |
| Example 7 | 51 | 35.1 | 11.6 |
| Example 8 | 49 | 35.5 | 12.0 |
| Example 9 | 45 | 33.9 | 12.2 |
| Comparative Example 1 | 68 | 38.9 | 15.9 |
| Comparative Example 2 | 80 | 35.9 | 15.3 |
| Comparative Example 3 | 87 | 37.0 | 21.8 |
| Comparative Example 4 | 70 | 39.3 | 15.5 |
| Comparative Example 5 | 64 | 35.3 | 11.7 |
| Comparative Example 6 | 66 | 34.4 | 13.4 |

Referring to Table 1, it was confirmed that the super absorbent polymers of Examples exhibited a centrifuge retention capacity equal to or higher than that of Comparative Examples, and exhibited a more improved absorption rate and a reduced content of water-soluble matter.

The invention claimed is:

1. A method for producing a super absorbent polymer, the method comprising the steps of:
    carrying out a cross-linking polymerization of a monomer composition including a monomer containing a water-soluble ethylenically unsaturated compound or a salt thereof, a foaming agent and a porous aerogel in the presence of an internal crosslinking agent; and
    drying, pulverizing and classifying the cross-linked hydrogel polymer,
    wherein the porous aerogel is a composite aerogel of one or more metal oxides selected from the group consisting of alkali metals and alkaline earth metals, and silica aerogel, which includes a plurality of nanopores.

2. The method for producing a super absorbent polymer of claim 1, wherein the porous aerogel has a BET specific surface area of 100 to 700 $m^2$/g and is a metal oxide-silica composite aerogel including a plurality of nanopores having an average diameter of 1 to 25 nm.

3. The method for producing a super absorbent polymer of claim 1, wherein the porous aerogel is a porous metal oxide-silica composite aerogel including alkali metals and alkaline earth metals.

4. The method for producing a super absorbent polymer of claim 1, wherein the porous aerogel contains 1 to 10% by weight of metal oxide relative to the total content.

5. The method for producing a super absorbent polymer of claim 1, wherein the monomer include at least one selected from the group consisting of anionic monomers of acrylic acid, methacrylic acid, maleic anhydride, fumaric acid, crotonic acid, itaconic acid, 2-acryloylethanesulfonic acid, 2-methacryloylethanesulfonic acid, 2-(meth)acryloylpropanesulfonic acid, or 2-(meth)acrylamido-2-methylpropanesulfonic acid, and their salts; non-ionic, hydrophilic group-containing monomers of (meth)acrylamide, N-substituted (meth)acrylate, 2-hydroxyethyl(meth)acrylate, 2-hydroxypropyl(meth)acrylate, methoxypolyethylene glycol(meth)acrylate or polyethylene glycol (meth)acrylate; and amino group-containing unsaturated monomers of (N,N)-dimethylaminoethyl (meth)acrylate or (N,N)-dimethylaminopropyl (meth)acrylamide, and their quaternary product.

6. The method for producing a super absorbent polymer of claim 1, wherein the foaming agent and the aerogel each is used in an amount of 0.05 to 5 parts by weight based on 100 parts by weight of the unsaturated compound contained in the above monomer.

7. The method for producing a super absorbent polymer of claim 1, wherein the foaming agent includes at least one selected from the group consisting of sodium bicarbonate, sodium carbonate, potassium bicarbonate, potassium carbonate, calcium bicarbonate, calcium carbonate, magnesium bicarbonate and magnesium carbonate.

8. The method for producing a super absorbent polymer of claim 1, wherein the internal crosslinking agent is at least one selected from the group consisting of N,N'-methylenebisacrylamide, trimethylolpropane tri(meth)acrylate, ethylene glycol di(meth)acrylate, polyethylene glycol di(meth)acrylate, propylene glycol di(meth)acrylate, polypropylene glycol di(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, and pentaerythritol tetraacrylate.

9. The method for producing a super absorbent polymer of claim 1, further comprising forming the surface cross-linked layer by further surface cross-linking the base polymer powder, after the step of forming the base polymer powder through drying, pulverizing and classifying steps.

10. The method for producing a super absorbent polymer of claim 9, wherein the surface cross-linking step is carried out in the presence of at least one surface cross-linking agent selected from the group consisting of polyhydric alcohol compounds, epoxy compounds, polyamine compounds, haloepoxy compounds and their condensed products, oxazoline compounds, mono-, di- and poly-oxazolidinone compounds, cyclic urea compounds, polyvalent metal salt and an alkylene carbonate compound.

11. A super absorbent polymer comprising:
   a base resin powder including a cross-linked polymer of a monomer containing a water-soluble ethylenically unsaturated monomer or a salt thereof; and
   a surface cross-linked layer that is formed on the base resin powder and is further cross-linked from the cross-linked polymer,
   wherein the super absorbent polymer comprises a porous aerogel including a plurality of nanopores within the cross-linked structure of the cross-linked polymer and including a composite aerogel of one or more metal oxides selected from the group consisting of alkali metals and alkaline earth metals, and silica.

12. The super absorbent polymer of claim 11, wherein the porous aerogel is a porous metal oxide-silica composite aerogel having a BET specific surface area of 100 to 700 $m^2/g$, and including a plurality of nanopores having an average diameter of 1 to 25 nm.

13. The super absorbent polymer of claim 11, wherein a centrifuge retention capacity (CRC) for a physiological saline solution (0.9 wt % sodium chloride aqueous solution) for 30 minutes is 30 to 45 g/g, and a vortex absorption rate of the super absorbent polymer having a particle diameter of 300 to 600 μm is 35 to 70 sec.

14. The super absorbent polymer of claim 11, wherein
   the super absorbent polymer has a content of water-soluble matter of 20% by weight or less.

* * * * *